US006895298B2

(12) United States Patent
Page

(10) Patent No.: US 6,895,298 B2
(45) Date of Patent: May 17, 2005

(54) MULTI-AXIS CUTTER DIAMETER COMPENSATION FOR NUMERIC CONTROL MACHINE TOOLS

(75) Inventor: Joseph F. Page, Rose Hill, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/346,310

(22) Filed: Jan. 17, 2003

(65) Prior Publication Data

US 2004/0143361 A1 Jul. 22, 2004

(51) Int. Cl.$^7$ .............................................. G06F 19/00
(52) U.S. Cl. ...................... 700/179; 700/182; 700/160; 700/245
(58) Field of Search ............................. 700/83, 86, 117, 700/118, 159, 160, 170–185, 245–250; 345/964–969

(56) References Cited

U.S. PATENT DOCUMENTS

| | | | |
|---|---|---|---|
| 2,933,244 A | | 4/1960 | Tripp |
| 3,482,357 A | | 12/1969 | Inaba et al. |
| 3,500,150 A | | 3/1970 | Foster |
| 3,621,614 A | | 11/1971 | Hikita et al. |
| 3,685,022 A | * | 8/1972 | Raynes .................... 340/172.5 |
| 3,866,027 A | * | 2/1975 | Cutler et al. ........... 235/151.11 |
| 3,866,179 A | | 2/1975 | McGee et al. |
| 3,939,330 A | | 2/1976 | Fluet |
| 4,084,243 A | | 4/1978 | Kishi et al. |
| 4,109,187 A | | 8/1978 | Steinberg et al. |
| 4,334,178 A | * | 6/1982 | Lipp .......................... 318/572 |
| 5,088,207 A | * | 2/1992 | Betsill et al. .............. 33/555.3 |
| 5,357,450 A | * | 10/1994 | Hemmerle et al. .... 364/551.01 |
| 5,923,560 A | * | 7/1999 | Ozaki et al. ............ 364/474.17 |
| 5,933,353 A | * | 8/1999 | Abriam et al. ......... 364/474.24 |
| 6,243,611 B1 | * | 6/2001 | Hazama et al. ................ 700/97 |
| 6,292,712 B1 | * | 9/2001 | Bullen ......................... 700/245 |
| 6,438,445 B1 | * | 8/2002 | Yoshida et al. .............. 700/173 |
| 6,574,527 B1 | * | 6/2003 | Courtney et al. ............ 700/719 |
| 2002/0103557 A1 | * | 8/2002 | Land ........................... 700/96 |
| 2002/0133264 A1 | * | 9/2002 | Maiteh et al. ............... 700/182 |
| 2003/0040834 A1 | * | 2/2003 | Coleman et al. ............ 700/191 |

OTHER PUBLICATIONS

James R. Fall, "What Does It Take To Internet–Enable Machine Tools?", Gardner Publications, Inc., The Modern Machine Shop Online 2001 Guide To Metalworking On The Internet.*

Brian Kapitan, "Motion Control Over The Ethernet" Machine Design Nov. 2, 2000, Penton Media, Inc.*

Allen Presher "Digital Networks Link Servos To The Factory Floor" Machine Design Nov. 2, 2000, Penton Media, Inc.*

The American Heritage Dictionary of the English Language 2000, 4$^{th}$ edition, Houghton Muifflin Company.*

* cited by examiner

Primary Examiner—Leo Picard
Assistant Examiner—Sean Shechtman
(74) Attorney, Agent, or Firm—Black Lowe & Graham PLLC

(57) ABSTRACT

A method, computer software program, and automated tool for utilizing cutters in the automated tool to produce a part includes measuring a cutter to determine a second radius, the second radius being different from a first radius, the first radius being the radius of the cutter as manufactured. A part for production on an automated tool is selected. The cutter is selected. The part is associated with the cutter. A numeric controlled cutting program based upon the second radius of the associated cutter is generated for producing the part.

16 Claims, 7 Drawing Sheets

MULTI-AXIS CUTTER DIAMETER COMPENSATION FOR NUMERIC CONTROL MACHINE TOOLS

FIELD OF THE INVENTION

This invention relates generally to robotics and, more specifically, to numeric controlled machinery.

BACKGROUND OF THE INVENTION

The automated use of precision machining techniques is based upon precise movement of a motorized spindle through three-dimension space with a cutter chucked in the spindle. The cutter removes material based on its geometric relation to the spindle. A cutter with a known diameter is moved in precise, calculated strokes across the surface of the material being machined in order to produce a part. The cutter removes material based on its geometric relation to the spindle.

A cutter is a tool that has a radius which represents the offset between the axis of the cutter and the cutter's cutting edge. The cutter also has a length that indicates the distance between one end of the cutting edge and the other. The cutter sits within a chuck on the turning spindle and when spinning, the length and radius of the cutter determine the location and the amount of material that the cutter will remove.

To date, there have existed many commercial off-the-shelf computer products that derive a series of movements of the spindle in space based upon a cutter's dimensions (i.e. its radius and length) and a numeric model of the part to be produced. Because these products require a great deal of computational time and processing power, a traditional means of optimizing production has been through use of cutters with standardized dimensions. Using cutters with standardized dimensions, allows a manufacturer to use a single derivation in order to produce a given part. Manufacturers then purchase cutters of standardized dimensions and use them until such time as wear on the cutting edge make them ineffective for producing parts. The manufacturer then disposes of the cutter.

Cutters can be readily and effectively sharpened, but doing so shortens the radius of the sharpened cutter in comparison to its radius when new. When used in place of a standardized cutter, the sharpened cutter produces a part that is outside of tolerances. Rather than to produce parts that are out of tolerance, the cutters were not generally resharpened for use though nothing inherently prevented resharpening of the cutters.

In recent years, advances in the fabrication of silicon chips have resulted in much faster computers. Tasks that previously took hours or indeed days can be performed in minutes. The new speed and capability available on inexpensive computers has drastically cut the time necessary to derive the strokes necessary to produce a given part with a cutter of given dimensions.

There exists, therefore, an unmet need in the art to re-derive numeric control programs for the production of parts using previously sharpened cutters.

SUMMARY OF THE INVENTION

The present invention provides a method and software for facilitating the derivation of numeric controlled cutting programs (on-the-fly). By placing the derivation of the numeric control program at the production level, the manufacturer efficiently uses its inventory of cutters regardless of the current diameter of the cutter in use.

A method for using previously sharpened cutters in an automated tool to produce a part is provided. In one exemplary embodiment, a part for production on an automated tool is selected. A previously sharpened cutter is selected based upon its radius and gauge length, and the part is associated with the previously sharpened cutter. A numeric controlled cutting program is opened based upon the part and the radius and gauge length of the associated previously-sharpened cutter.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, a method for utilizing previously-sharpened cutters in an automated tool to produce a part is provided. A part for production on an automated tool is selected. A previously-sharpened cutter is selected based upon its radius and gauge length, and the part is associated with the previously sharpened cutter. A numeric controlled and cutting program is generated based upon the part and the radius and gauge length of the associated previously-sharpened cutter.

The following discussion is intended to provide a general description of a suitable computing environment in which the invention may be implemented. While the invention will be described in the general context of an application program that runs on an operating system in conjunction with a personal computer and in connection with a server, those skilled in the art will readily recognize that the invention may also be implemented in combination with other program modules and on other platforms. Generally, program modules include routines, operating systems, application programs, components, data structures and the like that perform particular tasks or implement particular abstract data types. Moreover, those skilled in the art will appreciate that the invention may be practiced with other computer system configurations, including hand-held devices, multi-processor systems, microprocessor based or programmable computer electronics, minicomputers, mainframe computers, and the like.

The invention may also be practiced in distributed computing environments where tasks are performed by remote processing devices that are linked through a communications network. In a distributed computing environment, the program modules may be located in both local and remote memory storage devices. Execution of the program modules may occur locally in a stand-alone manner or remotely in a client/server manner. Examples of such distributed computing environments include local area networks of an office, enterprise wide computer networks, and the Internet.

Figure 1:
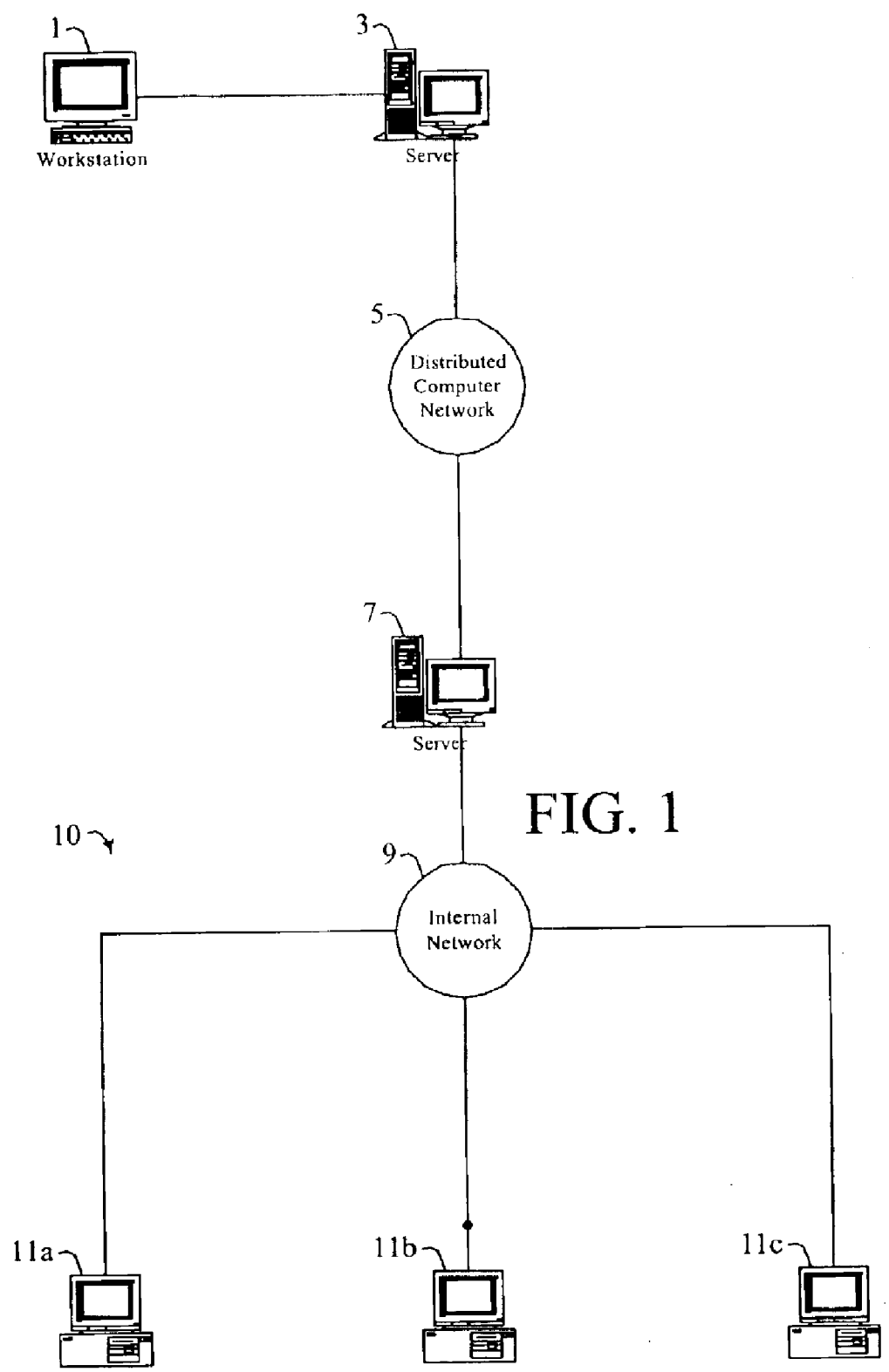
FIG. 1 is a network diagram of an exemplary network.

FIG. 1 illustrates a typical client/server environment 10 in which an exemplary embodiment of the present invention operates. A computer system or client 1 such as the conventional personal computer or any devices operable to communicate over a network is connected to an Internet server computer 3 ("server"). The server 3 is generally provided by an Internet service provider (ISP), which provides Internet access for a typical Internet user. The server 3 is connected to a distributed computer network, such as the Internet or a wide area network ("WAN"), and enables the client 1 to communicate via the distributed computer network 5.

The client 1 communicates via combination of the server 3 and the distributed computer network 5 to a server 7, such as communication or an email server. In an exemplary embodiment, servers 3 and 7 support email services, contain a message store for holding messages until delivery, and contain a translation facility or gateway for allowing users having different email programs to exchange mail. The server 7 is connected to an internal network 9, such as a local area network ("LAN") and enables the client 1 to communicate with the clients 11a, 11b, and 11c via the internal network 9.

The clients 11a, 11b, and 11c are not only able to respond to a communication from the client 1, but are also able to initiate communication with the client 1. The clients 11a, 11b, and 11c can send information via the internal network 9 to the server 7. The server 7, in turn, forwards the information to the client 1 via the distributed computer network 5. This information is retrieved by the server 3 and can be forwarded to the client 1, when requested by the client 1.

Figure 2:
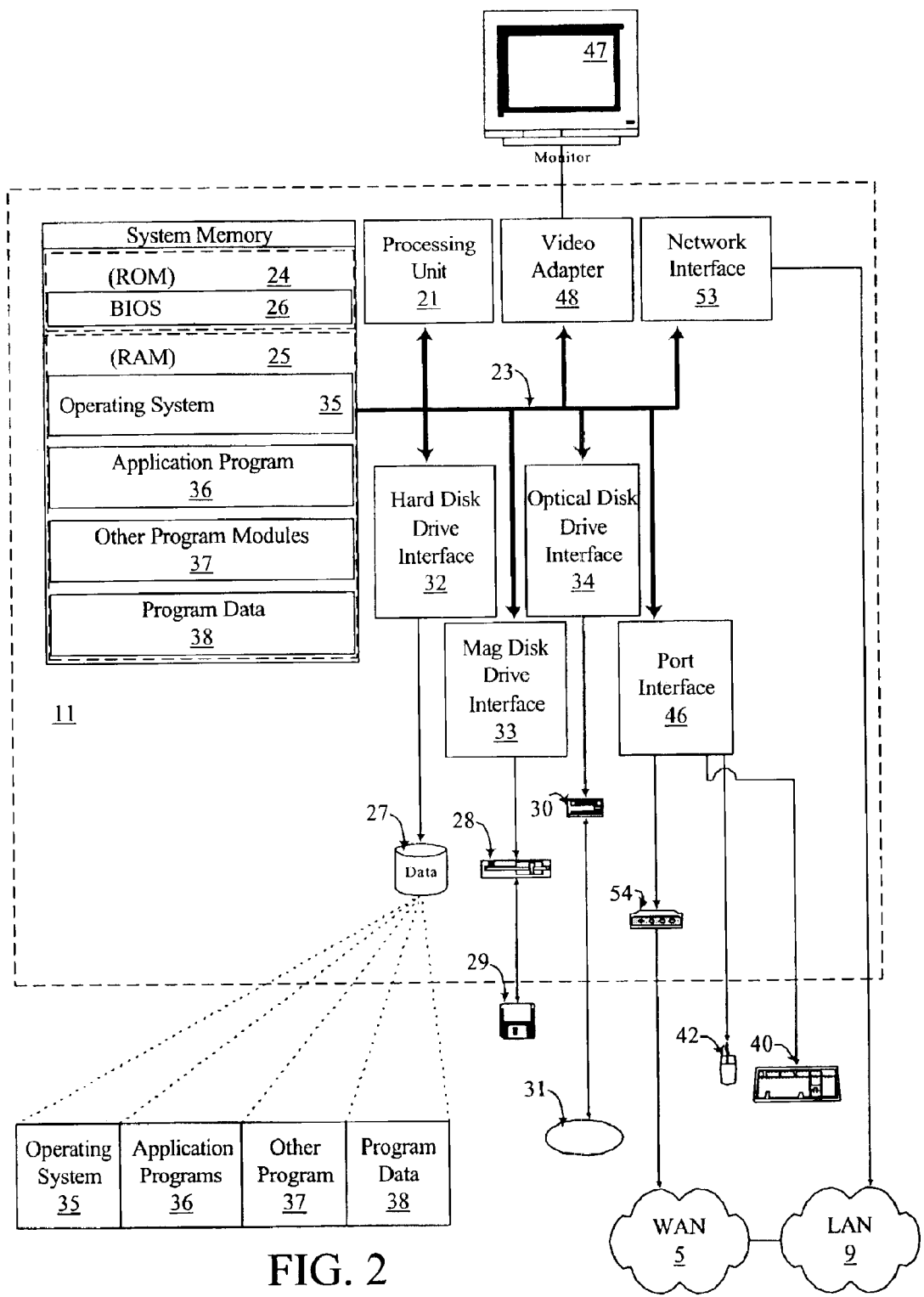
FIG. 2 is a schematic diagram of an exemplary client platform.
Figure 3:
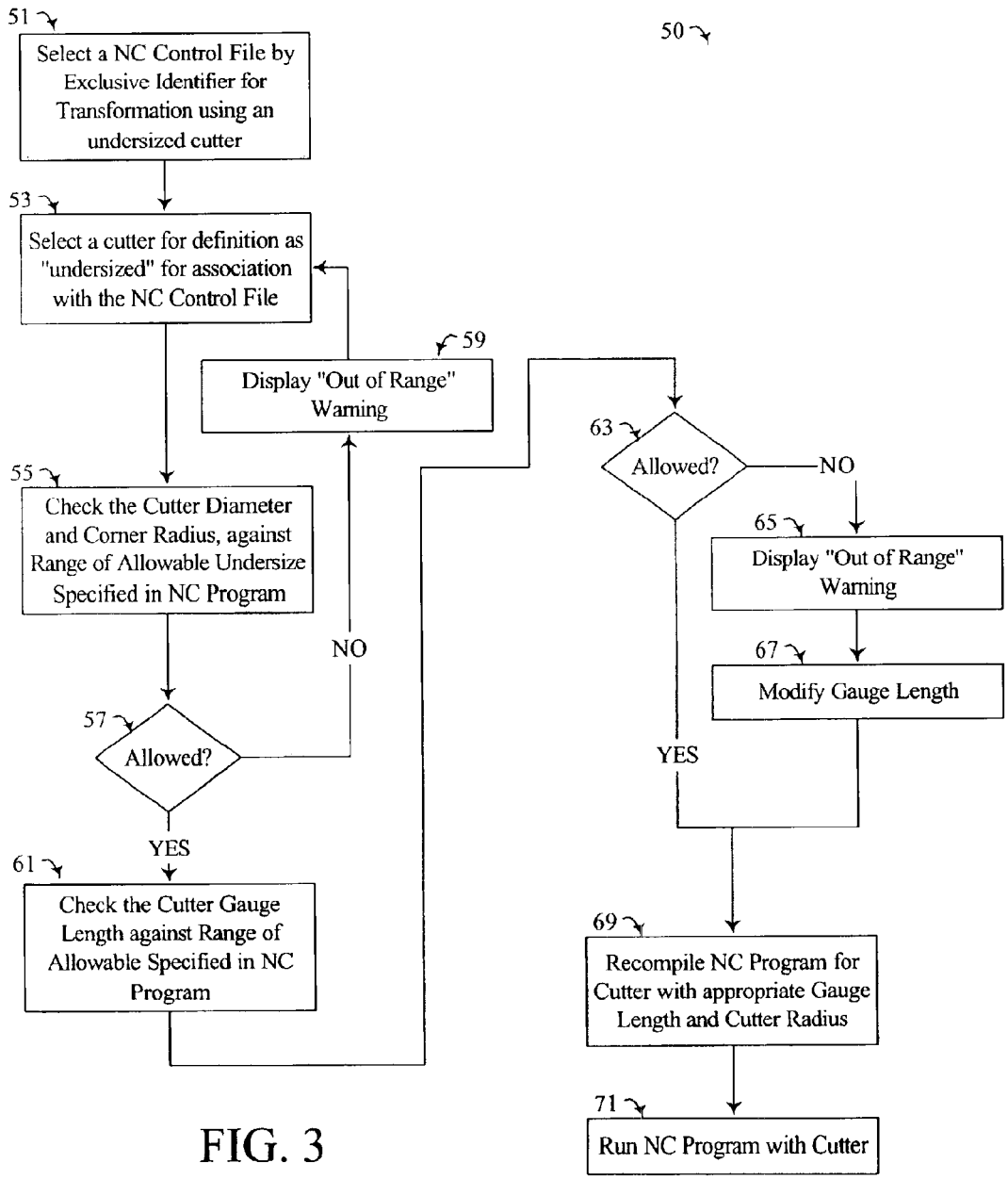
FIG. 3 is a flowchart of a method according to the present invention.

With reference to FIG. 2, an exemplary system for implementing the invention includes a conventional personal computer 11 which serves as a client. The client 11 may represent any or all of the clients 11, 11a, 11b, and 11c illustrated in FIG. 1. The client 11 includes a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing basic routines that help to transfer information between elements with the client 11 such as during startup is stored in ROM 24. The client 11 further includes a hard disk drive 27, a magnetic disk drive 28, e.g. to read from or write to a removable disk drive 29, an optical disk drive 30, a CD-ROM disk 31, or to read from or write to other media. The hard disk drive 27, the magnetic disk drive 28, and an optical disk drive 30 are connected to the system bus 23 by a hard disk drive interface 32, a magnetic disk drive interface 33, and an optical disk drive interface 34, respectively. The drives and their associated computer-readable media provide non-volatile storage for the client 11. Although the description of computer-readable media above refers to a hard disk, a removable magnetic disk, and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs, such as an email program module 36, other program modules, such as the message manager program module 37, and local message store 38, for supporting email applications. A user may enter commands and information into the client 11 through a keyboard 40 and a pointing device, such as a mouse 42. Other input devices (not shown) may include a pen, a touch operated device, a microphone, a joystick, a game pad, a satellite dish, a scanner, or the like. These and other input devices are often connected to the processing unit 21 through a port interface 46 that is coupled to the system bus, but may be connected by other interfaces, such as a serial port, a game port, or a universal serial bus (USB). A monitor 47 or other type of display device is also connected to the system bus 23 via an interface, such as the Video Doctor 48. In addition to the monitor, personal computers typically include other peripheral output devices (not shown), such as speakers or printers.

The client 11 operates typically in a networked environment using logical connections to one or more remote computers, such as the remote computer 7 (FIG. 1). The remote computer 7 (FIG. 1) may be an email server (which includes one or more message stores), as described above in connection with FIG. 1. A file server (which includes one or more files stores), a router, a peer device or other common network note, and typically includes many or all of the elements described relative to the client 11. The logical connections depicted in FIG. 2 include the local area network (LAN) or the wide area network (WAN) 5. Such networking environments are commonplace in offices, enterprise wide computer networks, intranets, and the Internet. When used in a LAN networking environment, the client 11 is connected to the LAN 9 through a network interface 53 or additionally through the WAN 5. When used in an a WAN networking environment, the client 11 typically includes a modem 54 or other means for establishing communications over the WAN 5 such as the Internet. The modem 54 which may be internal or external is connected to the system bus 23 via the serial port interface 46. In a networked environment, the program modules depicted relative to the client 11, or portions thereof, may be stored in the remote memory storage device. It will be appreciated that the network connections shown are exemplary in other means of establishing a communications link between the computers may be used.

Figure 4:
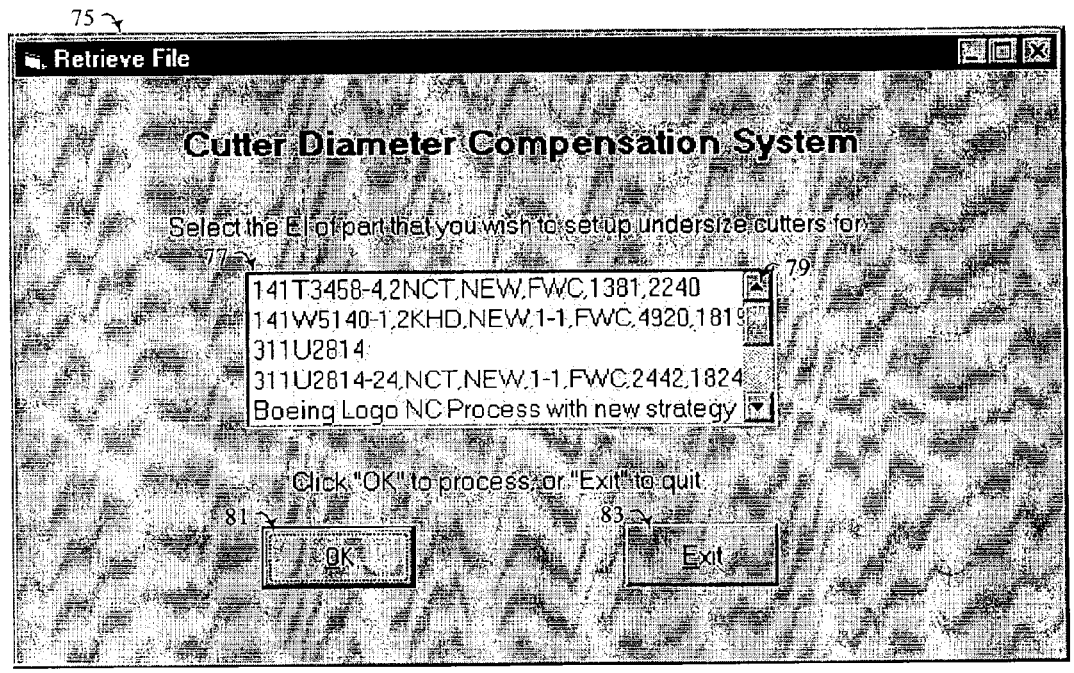
FIG. 4 is a dialog box used to select a part for association with a cutter.
Figure 5:
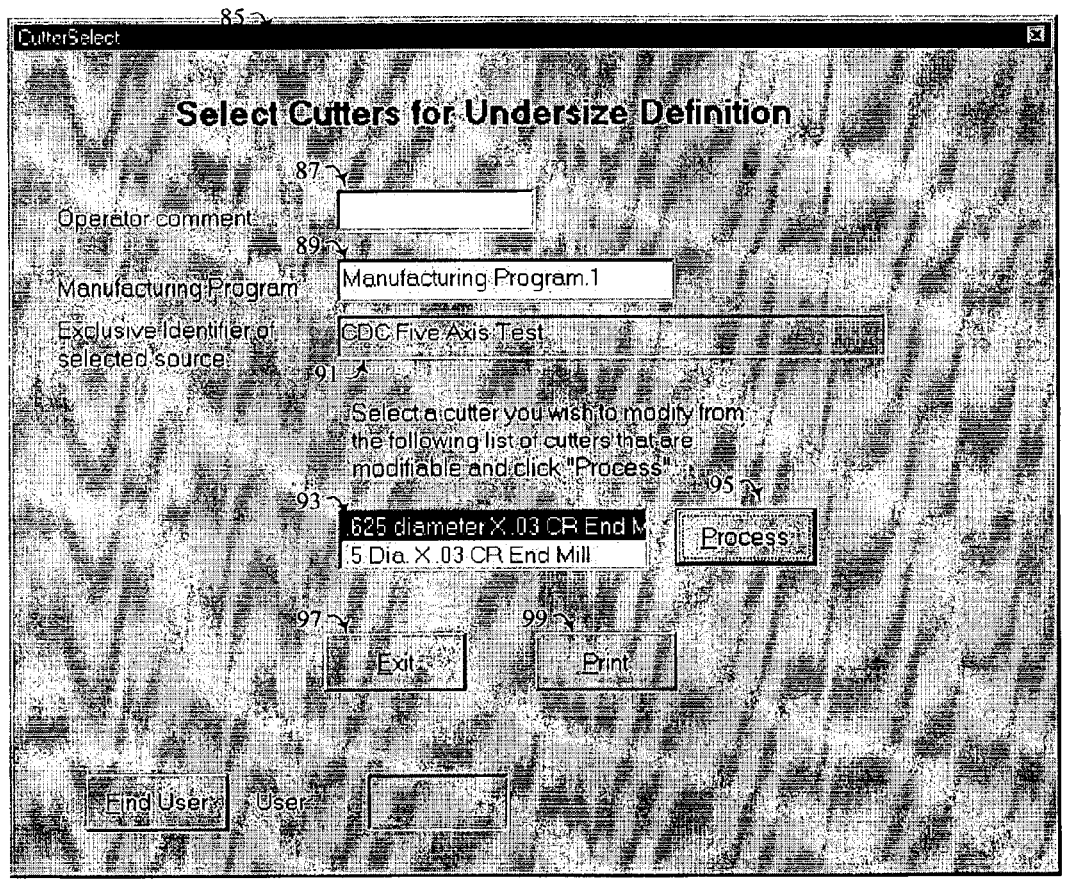
FIG. 5 is a dialog box for associating a cutter with the selected part.

Referring now to FIGS. 1–5, a dialog box 85 provides means for selecting a cutter for creating the part 53 (FIG. 4). Here, the dialog box 85 displays in "grayed out" text, the name of the part the operator wishes to produce in a windowpane 91 (indicating that the part definition is no longer selectable). A second pane 93 allows the user to associate any of several undersized cutters available with the part in question in a similar maimer as the previous pane 91. In the pane 89, the program that the user seeks to compile is used. Optionally, in a pane 87 any comments may be included that would be useful to the user to further describe the program. When the parameters are set, the user presses a button 95 to process and compile the numeric control program to produce the part. Advantageously, a print button 99 is included to allow printing of the numeric control program for later study.

At a block 53, the user selects a cutter for definition to associate with the model selected at the block 51. Taken together, the selected part model and the selected cutter will define an appropriate series of cutting strokes to machine a tool. At a block 55, the user checks the cutting diameter and corner radius against the range of undersized tools allowable for machining the part in question. In the event that the undersized tool is too large to cut the necessary corners in the machining of the tool, the tool is disqualified at a decision block 57. At a block 59, the display indicates that tool is out-of-range, the routine 50 returns to the block 53 where the operator can select another suitable cutter.

Assuming that the cutter is appropriately sized for the part in question, at a block 61 the cutter gauge length is checked against the range of allowable gauge lengths. At a block 63 a determination is made whether the gauge length is allowed. If the gauge length is not allowed, at a block 65, an out-of-range warning is displayed on the display. At a block 67, the user is provided an opportunity to modify the gauge length.

If the gauge length is allowed, at a block 69 any of a number of commercial off-the-shelf products appropriate to compile an NC cutting program is invoked and the NC cutting program is compiled for producing the part in question with the selected cutter.

At a block 71, the newly compiled NC program is run with the selected cutter to produce the part. According to the present invention, such parts will continue to be produced until the cutter is either too dull to reliably produce the defined part or a sufficient quantity of parts has been produced.

Referring now to FIGS. 1–4, a dialog box 75 allows the user to select the pre-defined definition of the part the operator wishes to produce. A list pane 77 with a scroll-down bar 79 allows the operator to survey those part definitions stored on the network. Where the user finds the appropriate part, the user moves a cursor to indicate that part and then either double-clicks on the definition or moves the cursor down to button 81 to click OK, thereby selecting the appropriate part definition. If for any reason the user wishes to defer the decision, the user merely clicks a button 83 and exits the process.

Referring now to FIGS. 1–5, a dialog box 85 provides means for selecting a cutter for creating the part 53 (FIG. 4). Here, the dialog box 85 displays in "grayed out" text, the name of the part the operator wishes to produce in a window pane 91 (indicating that the part definition is no longer selectable). A second pane 93 allows the user to associate any of several undersized cutters available with the part in question in a similar manner as the previous pane 91. In the pane 89, the program that the user seeks to compile is used. Optionally, in a pane 87 any comments may be included that would be useful to the user to further describe the program. When the parameters are set, the user presses a button 95 to process and compile the numeric control program to produce the part. In the event that the it is no longer desirable to compile the program, the user clicks an "exit" button 97 to cancel the action. In the event a "hard copy" is desired, the user clicks a "print" button commanding the production of the document on a designated printer.

Figure 6:
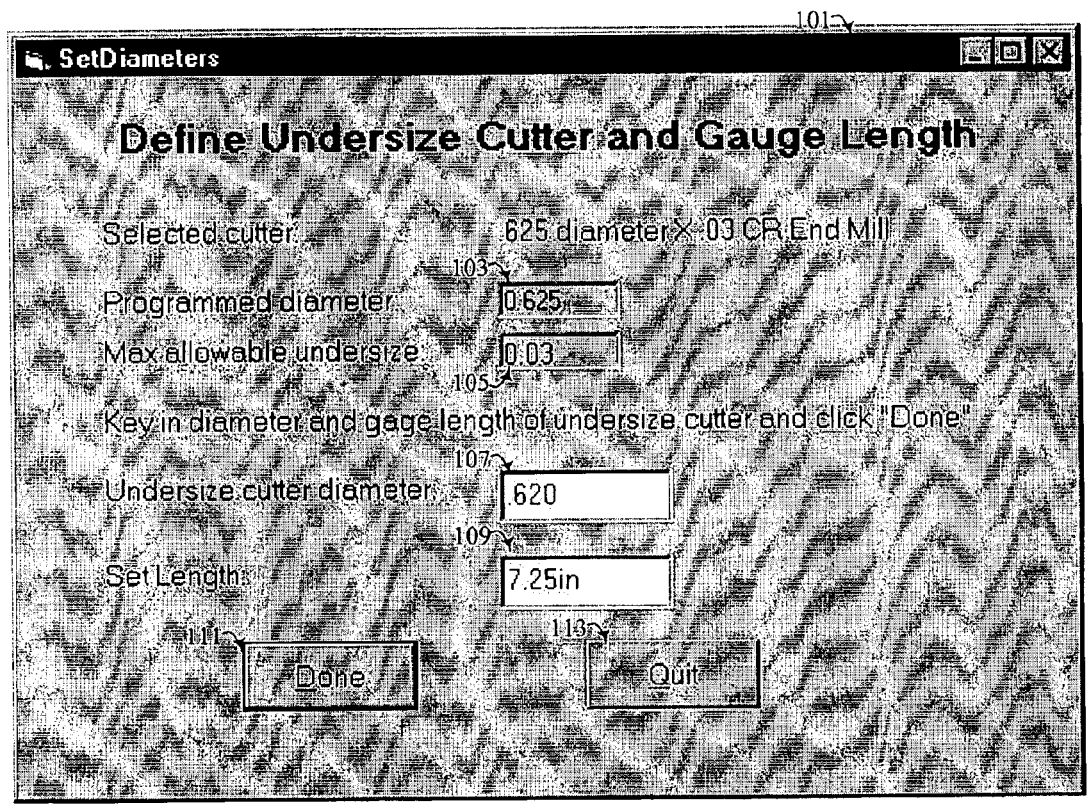
FIG. 6 is a dialog box for modifying the definition of the selected cutter.

Referring to FIG. 6, the user is presented with a dialog box 101 as a check against possible misassociation of a cutter and its dimensions. In a pane 103, the program diameter of the selected cutter is shown in "grayed-out" text. Similarly, the maximum allowable undersize of the cutter is showed in "grayed-out" text in pane 105. The user measures the cutter with a micrometer and enters the diameter of the cutter in a pane 107 along with the set length in pane 109. When suitably entered, the user clicks on a button 111 to indicate that user is done and to pass the information back to the program. For any reason the user wishes to exit the program, a button 113 may be activated.

Figure 7:
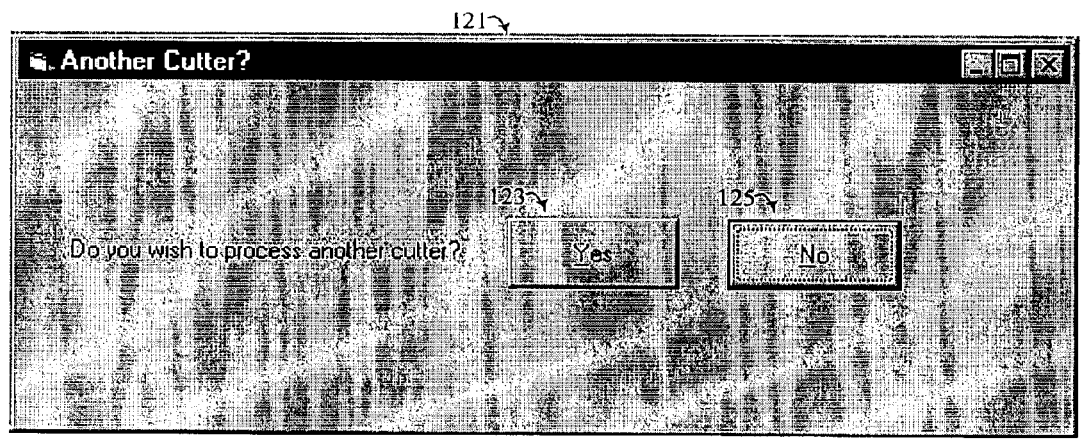
FIG. 7 is a dialog box used to exit the program.

FIG. 7 portrays a dialog box 121 presented to the user in the event that the selected cutter is not appropriately sized. If the user wishes to return to that portion of the process to select a different cutter, the user may indicate so by clicking on a button 123. Otherwise, the user may exit the program by selecting the button 125.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A tool for automatically milling a part, the tool comprising:
    a controllable end effecter with a chuck to accept a cutter having a second radius, different from a first radius, and having a gauge length, the cutter having been manufactured to have the first radius different from the second radius, the end effecter being configured to mill a part; and
    a central processing unit electrically coupled to the end effecter such that the central processing unit is configured to control the end effecter; and
    an addressable memory, the memory configured for storing computer software program code at a first addressable site within the addressable memory readably accessible to the central processing unit, the addressable memory-including:
        the second radius and the gauge length stored at a second addressable site within the addressable memory in association with the cutter;
        a first software component configured to select the cutter inserted in the chuck based upon the second radius of the cutter;
        a second software component configured to select a part for production, a numeric model of the part being stored at a third addressable site within the addressable memory in association with the part; and
        a third software component configured to initiate an executable program for execution on an automated tool, the third software component being stored at a fourth addressable site within the addressable memory, the third software component being further configured to generate an executable instruction set based upon the selected cutter, the second radius, and the gauge length and the selected part and associated numeric model, the third software component storing the executable instruction set at the first addressable memory site within the addressable memory.

2. The tool of claim 1, wherein the third software component includes a CAD/CAM program configured for generating a numeric controlled cutting program.

3. The tool of claim 2, wherein the CAD/CAM program includes a commercial off-the-shelf program.

4. The software product of claim 1, further comprising a user interface to facilitate interaction with the first software component, the second component, and the third software component.

5. The tool of claim 4, wherein the user-interface further includes a fourth software component configured to initiate the executable program on the automated tool.

6. The tool of claim 1, wherein the selected cutter, the second radius, and the gauge length are distributed to include sites within an addressable network.

7. The tool of claim 6, wherein the addressable network includes the Internet.

8. The tool of claim 1, wherein the third software component includes a verification component.

9. The tool of claim 8, wherein the verification component simulates the movement of the end effecter in three-dimensioned space.

10. A software product for commencing an executable instruction set stored at a first addressable site on a computer network and directing an automated tool to machine a part, the software product comprising:

a first software component configured to select a cutter, based upon a second radius and gauge length of the cutter, the second radius different from a first radius, the first radius being the radius of the cutter as manufactured, and the second radius and gauge length being stored at a second addressable site within the network in association with the cutter;

a second software component configured to select a name of a part for production, a numeric model of the part being stored at a second addressable site within the network in association with the name; and a third software component configured to initiate an executable program for execution on an automated tool, the third software component being stored at a third addressable site within the network, the third software component being configured to generate an executable instruction set based upon the selected cutter and the second radius and gauge length and the selected part and associated numeric model, the third software component being further configured for storing the executable instruction set at the first addressable memory site within the network.

11. The software product of claim 10, wherein the third software component includes a CAD/CAM program configured for generating a numeric controlled cutting program.

12. The software product of claim 11, wherein the CAD/CAM program includes a commercial off-the-shelf program.

13. The software product of claim 10, further comprising a user interface to facilitate interaction with the first software component, the second component, and the third software component.

14. The software product of claim 13, wherein the user-interface further includes a fourth software component configured to initiate the executable program on the automated tool.

15. The software product of claim 14, wherein the user-interface further includes a fifth software component configured to receive information from the executable program.

16. The software product of claim 15, wherein the user interface is configured to display received information.

* * * * *